(12) United States Patent
Evans et al.

(10) Patent No.: US 7,911,727 B2
(45) Date of Patent: Mar. 22, 2011

(54) CONTROLLING MOTION OF STORAGE MEDIA

(75) Inventors: Nigel Ronald Evans, Bristol (GB); Russell Ian Monk, Caldicot (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 12/243,041

(22) Filed: Oct. 1, 2008

(65) Prior Publication Data
US 2010/0014182 A1 Jan. 21, 2010

(30) Foreign Application Priority Data
Jul. 17, 2008 (GB) .................................. 0813026.2

(51) Int. Cl.
*G11B 19/02* (2006.01)
(52) U.S. Cl. .............. 360/71; 360/72.1; 360/75; 360/31
(58) Field of Classification Search .................. None
See application file for complete search history.

(56) References Cited

U.S. PATENT DOCUMENTS

| 5,959,799 A | * | 9/1999 | Deoka .............................. 360/70 |
| 6,101,061 A | * | 8/2000 | Goker ......................... 360/73.08 |
| 6,526,482 B1 | * | 2/2003 | Nonoyama et al. ........... 711/154 |

FOREIGN PATENT DOCUMENTS

| EP | 0 720 164 A2 | 3/1996 |
| GB | 2 331 395 A | 5/1999 |
| GB | 2 446 183 A | 6/2008 |

OTHER PUBLICATIONS

GB Search Report from priority application, dated Aug. 28, 2008.

* cited by examiner

*Primary Examiner* — Jason C Olson

(57) ABSTRACT

An apparatus for writing data to a data storage medium on which data is stored in data groups (N−3 to N+1) comprising tracks extending across and spaced from a reference edge of the storage medium includes a control system operable to cause i) a track reference difference value representative of a difference in a distance between the tracks of an existing data group (N−1) on the storage medium and the reference edge and a distance between the reference edge and the tracks of a data group (N) to be written to the storage medium such that it is the next data group following the existing data group (N−1) or ii) data from which such a difference value can be derived to be included in at least one of frame ($A_1$ to $A_5$) to be written between the existing data group and the next data group such that the tracks of the at least one frame are spaced from the reference edge by substantially the same distance as the tracks of the existing data group.

14 Claims, 3 Drawing Sheets

CONTROLLING MOTION OF STORAGE MEDIA

CROSS-REFERENCE TO RELATED APPLICATION

This claims priority under 35 U.S.C. §119 to Great Britain Patent Application GB 0813026.2, filed Jul. 17, 2008, which is hereby incorporated by reference.

BACKGROUND OF THE INVENTION

Data may be written onto a storage medium, such as magnetic or optical tape, in the form of a sequence of data blocks identified by a unique block identifier. A varying number of these data blocks may be grouped together to form a data group or other group that may be used to designate certain areas of the medium (for example "End Of Data"). The data group is typically the smallest entity that can be written to this medium and contains user data.

The operation of adding new data groups to a medium which already has existing data groups written upon it is usually referred to as "appending". In addition data groups may be written over previously written data with the result that there may be a boundary at one or both ends of the newly written data between previously written and the newly written data. For convenience, in the description that follows such newly written data is also referred to as "appended".

One method of storing and reading data on tape media is to use helical scan recording. In a helical scan recording/read apparatus (usually referred to as a 'tape drive') data is recorded on and read from a tape by a rotating drum carrying one or more electromagnetic heads. The tape is moved by a motor driven capstan along a path extending between two tape reels and partially around the drum. The plane of rotation of the drum is inclined to the plane of the tape so that the electromagnetic head(s) traverse the tape along successive tracks extending across the width of the tape at an angle to its centreline.

To obtain optimum data retrieval during a read operation, the electromagnetic read head(s) of a helical scan tape drive have to "lock" onto the data on the tape so as to accurately follow the tracks across the tape. This requires control of the relative motion of the tape and drum by controlling rotation of the drum and/or movement of the tape by the capstan. The control process includes using a track reference value, which is representative of the spacing of the data tracks from the lower edge ("reference edge") of the tape.

The conditions during an append operation may differ from those prevailing during a previous write operation resulting in the tracks of the appended data groups being at a different height to the tracks of the previously written data. This is most likely to happen where the appended data is written by a different tape drive, although other factors, such as temperature, wear or changes of settings of the tape drive components or wear of the tape, may also produce a change in cases in which the same tape drive is used.

Often, a tape drive can cope with differences in the height of the tracks before and after the append point, although, this reduces the signal-to-noise (SRT) and resultant error test (ERT) margin. However, the height difference can cause the tape drive to lose lock at the append point. If that happens, the tape drive has to back over the append point and perform a Time-Tracking calibration, measuring the height of the data after the append point and sometimes before the append point as well. Sometimes this Time-Tracking calibration and subsequent retries fail, even though the tape drive has a good error performance. This is generally due to the appended data being written at an extreme height difference or because there is some feature of the written data at the append point where the Time-Tracking measurements are performed that causes an inadequate measurement (for example a localised bad error rate).

Even when Time-Tracking calibration is successful, the process of making the measurements slows the operation of the tape drive and leads to increased wear of the tape. It is also possible that due to a less than optimal tape path set up in a particular tape drive, the changes in tape direction required during repositioning events will give rise to tape path guiding issues.

BRIEF DESCRIPTION OF THE DRAWINGS

In order that the invention may be well understood, some embodiments thereof, which are given by way of example only will now be described with reference to the drawings in which.

DETAILED DESCRIPTION

The embodiment of data transfer apparatus described below is based on the DDS technology and is for operation in accordance with the DAT 160 format. Initially the main components of the data transfer apparatus will be described and thereafter modifications that implement an embodiment of this invention will be described.

Figure 1:
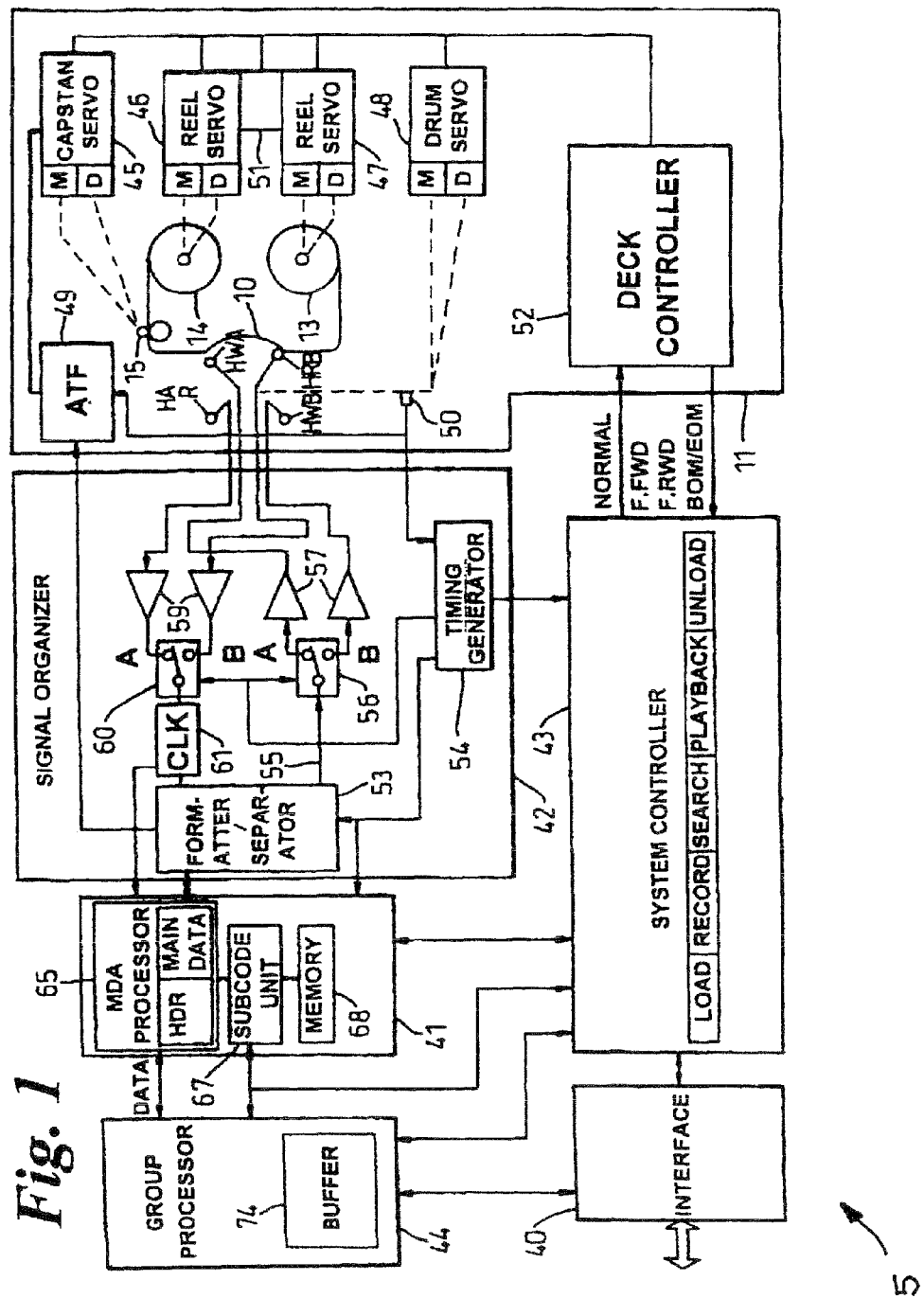
FIG. 1 is a block diagram of the main components of a data storage apparatus for helical scan recording.
Figure 2:
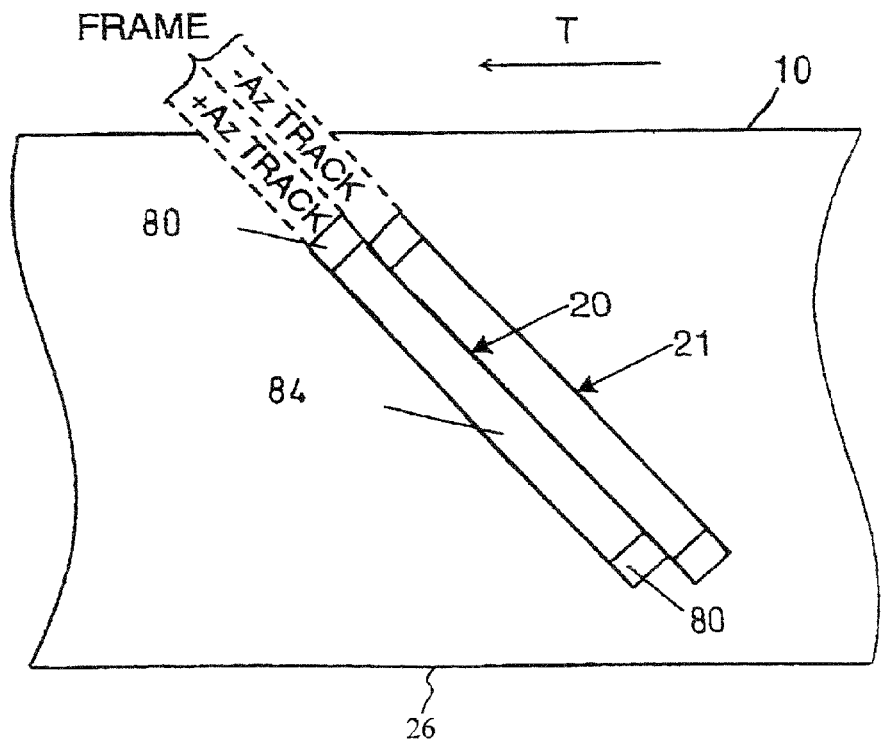
FIG. 2 is a diagrammatic representation of two data tracks recorded on a tape during helical scan recording.

Referring to FIG. 1, the data transfer apparatus is a tape storage and retrieval apparatus ("tape drive") 5 that utilizes a helical scan technique for storing data in oblique tracks on a recording tape in a format similar to that used for the storage of PCM audio data according to the DAT Conference Standard (June 1987 Electronic Industries Association of Japan, Tokyo, Japan). The tape drive 5 is, however, adapted for storing computer data rather than digitised audio information. The tape drive 5 includes a helical-scan tape deck 11 in which tape 10 passes at a predetermined angle across a rotary head drum (not shown) with a wrap angle of approximately 90°. In operation, the tape 10 is moved from a supply reel 13 to a take-up reel 14 by rotation of a capstan 15 against which the tape is pressed by a pinch roller; at the same time, the head drum is rotated. The head drum houses two diametrically opposed electromagnetic read heads HRA, HRB and two diametrically opposed electromagnetic write heads HWA, HWB, offset by 90°. In known manner, the write heads HWA, HWB are arranged to write overlapping oblique tracks 20, 21 (FIG. 2) across the tape 10. The track 20 written by head HWA has a positive azimuth while the track 21 written by head HWB has a negative azimuth; each pair of positive and negative azimuth tracks constitutes a frame. The tracks 20, 21 are used to store data provided to the apparatus (main data), together with items of auxiliary information known as subcodes, which will be described in more detail below. The tracks also contain synchronization bytes ('sync bytes') to enable data byte boundaries to be identified, and which are used to generate timing signals for controlling tape movement relative to the electromagnetic heads HWA, HBW, HRA and HRB. Pre-amble blocks included in the tracks 20, 21 contain timing data patterns to facilitate timing synchronization on playback.

In addition to the tape deck 11, the tape drive 5 includes an interface unit 40 for interfacing the tape drive with a computer (not shown); a group processor 44 and a frame data processor 41 for processing main data and sub-codes into and out of a Main Data Fragment; a signal organizer 42 for composing/decomposing the signals for writing/reading a track and for appropriately switching the four heads HWA, HWB, HRA and HRB and a system controller 43 for controlling the operation of the tape drive in response to commands received from a computer via the interface unit 40. Each of the main component units of the tape drive 5 will be further described below.

The tape drive 5 is arranged to respond to commands from a computer to load/unload a tape, to store a data record and other logical segmentation marks, to search for a selected record using the segmentation marks, and the read back the next record.

The interface unit 40 is arranged to receive the commands from the computer and to manage the transfer of data records and logical data segmentation marks between the tape drive 5 and computer. Upon receiving a command from the computer, the interface unit 40 passes it on to the system controller 43 which, in due course will send a response back to the computer via the interface unit indicating compliance or otherwise with the original command. Once the tape drive has been set up by the system controller 43 in response to a command from the computer to store or read data, then the interface unit 40 will also control the passage of records and segmentation marks between the computer and the group processor 44.

During data storage the group processor 44 is arranged to segment the data provided to it in the form of data records into data packages (referred to as "data groups") each containing an amount of data corresponding to a fixed number of frames (twenty three for the DAT 160 Format), with an index that holds information regarding the logical segmentation of the data (record divisions, file marks) which is generated by the processor 44. Each frame comprises two tracks 20, 21. The group processor 44 also generates certain sub-codes whose contents are group-dependent or concern the logical segmentation of data. To facilitate these tasks and the transfer of data to and from the group processor 44, the latter is provided with a large buffer 74 which is arranged to hold several (for example, three) group's worth of data.

Once a data group, including its index, has been assembled, it is transferred a frame at a time to the frame data processor 41. In order to speed the transfer of data between the group processor 44 and frame data processor 41, it is advantageous for the frame data processor 41 to be managed in terms of groups for receiving data from the group processor 44. In other words, during recording, the frame data processor 41 is told by the group processor 44 when a group is ready for processing after which the frame data processor 41 accesses the frames of the group autonomously from the buffer 74.

When data is being read from tape, the group processor 44 is arranged to receive main data on a frame-by-frame basis, the data being written into the buffer 74 in such a manner as to build up a group. The group processor 44 can then access the group index to recover information on the logical organization (record structure, file marks) of the main data in the group. Using this information the group processor can pass the requested record or segmentation mark to the computer via the interface unit 40.

The frame data processor 41 functionally comprises a Main-Data-Area (MDA) processor 65 and a sub-code unit 67 with an associated electronic memory 68 for tape usage data (in practice, these functional elements may be constituted by a single microprocessor running appropriate processes under program control).

The sub-code unit 67 is arranged to provide sub-codes to the MDA processor 65 as required during recording and to receive and distribute sub-codes from the processor 65 during playback. Dependent on their information content, sub-codes may be generated/required by the group processor 44 or the system controller 43. In the case of non-varying sub-codes such as certain recording parameters, the sub-codes may be permanently stored in the sub-code unit 67. Furthermore, frame-dependent sub-codes may conveniently be generated by the sub-code unit 67 itself.

The MDA processor 65 is arranged to process a frame's worth of main data at a time together with the associated sub-codes. Thus during recording, the MDA processor 65 receives a frame's worth of main data from the group processor 44 together with sub-codes from the unit 67. On receiving the main data the processor 65 interleaves the data, and calculates error correcting codes and parity values before assembling the resultant data and sub-codes relating to the two tracks making up a frame. Before assembling the main data with the sub-codes, scrambling (randomising) of the data may be effected to ensure a consistent RF envelope independent of the data content of a track signal.

During playback, the MDA processor 65 effects a reverse process on the contents of the same frame. Unscrambled error-corrected and de-interleaved main data are passed to the group processor 44 and sub-codes are separated off and distributed by the sub-code unit 67 to the group processor 44 or system controller 43 as required.

The signal organizer 42 comprises a formatter/separator unit 53 which during recording (data writing) is arranged to assemble the track contents provided by the frame data processor 41, to form the signal including sync bytes to be recorded on each successive track. The necessary preamble patterns are also inserted into the track signals where necessary by the formatter/separator unit 53. Timing signals for coordinating the operation of the formatter/separator unit 53 with rotation of the electromagnetic heads HWA, HWB, are provided by a timing generator 54 fed with drum position signals output by a pulse generator 50 responsive to head drum rotation and located in the tape deck 11. The track signals output on line 55 from the unit 53 are passed alternately to head HRA and head HRB via a head switch 56, respective head drive amplifiers 57, and a rotary transformer (not shown) which is incorporated in the rotary head drum and which provides contact-less connection to the heads HRA, HRB, HWA and HWB. The head switch 56 is operated by appropriate timed signals from the timing generator 54.

During playback (data reading) the track signals alternately generated by the heads HRA and HRB are fed via the rotary transformer, respective read amplifiers 59, a second head switch 60, and a clock recovery circuit 61, to the input of formatter/separator unit 53. The operation of the head switch 60 is controlled in the same manner as that of the head switch 56. The formatter/separator unit 53 now serves to generate signals indicating the timing of the predetermined regions (incorporating the sync bytes) in the track signals, to supply the timing signals to an automatic track following (ATF) circuit 49 in the tape deck 11, and to pass the track contents to the frame data processor 41. Clock signals are also passed to the processor 41 from the clock recovery circuit 61.

During reading, the system controller 43 also controls the timing of the read cycles to ensure that the read heads HRA and HRB do not start reading the tracks 20, 21 too early or too late. For this purpose the system controller 43 monitors various parameters including the track reference value. The track reference value is representative of the distance the tracks are spaced from the lower edge 26 of the tape (usually referred to as the "height" from the "reference tape edge"). As the track height increases or decreases, so the read heads HRA and HRB need to start reading later or earlier in the read cycle. The system controller 43 accordingly maintains a track reference value and uses this as a reference value in controlling the timing of the read cycle. Specifically, a delay between the occurrence of a signal generated at a predetermined angular position of the drum and a reference signal provided in the tracks is measured and the relative motion of the tape 10 and drum is controlled to maintain the measured delay in a predetermined relationship with the track reference value.

The tape deck 11 has four servos, namely a capstan servo 45 for controlling the rotation of the capstan 15, first and second reel servos 46, 47 for controlling rotation of the reels 13, 14 respectively, and a drum servo 48 for controlling the rotation of the head drum. Each servo includes a motor M and a rotation detector D both coupled to the element controlled by the servo. Associated with the reel servos 46, 47 is a detector 51 for sensing the ends of the tape: beginning of media (BOM) and end-of media (EOM); this detector 51 may be based for example on motor current sensing, as the motor current of whichever reel is being driven to wind in tape (dependent on the direction of tape travel) will increase significantly upon stalling of the motor at BOM/EOM.

The operation of the tape deck 11 is controlled by a deck controller 52 which is connected to the servos 45 to 48 and to the BOM/EOM detector 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos, by extracting logical position information from the sub-codes.

The deck controller 52 is itself governed by control signals issued by the system controller 43. The deck controller 52 is arranged to output to the controller 43 signals indicative of BOM and EOM being reached.

The system controller 43 serves both to manage high-level interaction between the computer and tape drive 5 and to co-ordinate the functioning of the other units of the tape drive in carrying out the basic operations of Load-Record-Search-Playback-Unload requested by the computer. In this latter respect, the system controller 43 serves to co-ordinate the operation of the tape deck 11 with the data processing portion of the tape drive.

In controlling the tape deck 11, the system controller 43 can request the deck controller 52 to move the tape at the normal read/write speed (Normal), or to move the tape forwards or backwards at high speed, that is Fast Forward (F.FWD) or Fast Rewind (F.RWD), or to move the tape forward at a speed that is a specified fraction of the normal read/write speed while Time-Tracking calibration measurements are made. The speed used for Time-Tracking measurements is usually slower than the normal read/write speed; for example, $^{14}/_{32}$ of the normal speed.

Figure 3:
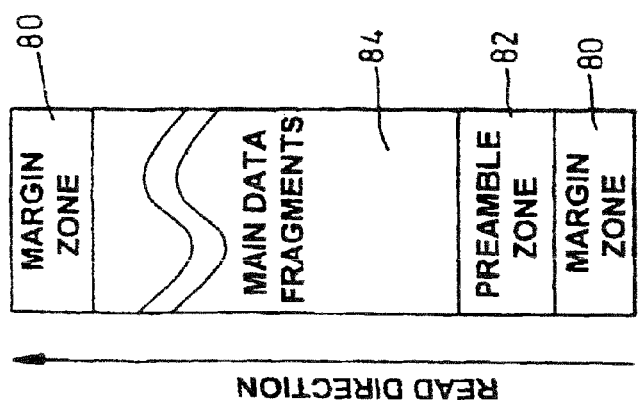
FIG. 3 is a block diagram representing the structure of a data track recorded by helical scan recording.

Having described the tape drive 5 in detail, the structure of the data and in particular the sub-codes will now be described with particular reference to DAT 160. In the DAT 160 scheme, data to be recorded is assembled into basic data groups. Each data group is divided into twenty three frames that have respective Logical Frame IDs (LFIDs) numbered 1 to 23. Each frame is written to tape in the form of two adjacent tracks of opposite azimuth. Referring to FIG. 3, each track consists of two margin zones 80, a preamble zone 82, and a main data zone 84 comprising a series of 96 Main Data Fragments.

Figure 4:
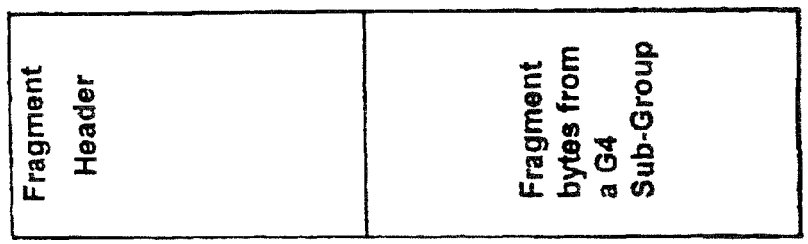
FIG. 4 is diagram representing a Main Data Fragment of a data track as shown in FIG. 3.

The structure of a Main Data Fragment is shown in FIG. 4. From this it will be seen that each Main Data Fragment has a fragment header of eight bytes followed by 124 data bytes. Of the header bytes, four bytes identified SC0 to SC3 contain one pack item of sub-code information. Sub-code information is embedded along each track within the fragment header. The sub-code information specifies information such as the running number of the group, the number of separators written since the beginning of the tape, the number of records written since the beginning of the tape, information about the track content and information about the history of the tape. The sub-code information is arranged as 4-byte pack items and, in DAT 160, there are 16 different pack items and 384 Main Data Fragments per track and so, if all 16 pack items were repeated in a track, each track would contain 6 of any particular pack item.

When the tape drive 5 is about to append a new data group or groups, it must first determine the track reference value of the existing data group immediately prior to the append point after which the new data group(s) are to be written. This value is obtained using a real time measurement process that includes operating the capstan 15 such that the tape 10 is moved past the drum at a speed different to its normal speed during read and write operations. The capstan 15 is operated in such a way that the data group makes multiple passes of the drum to allow multiple measurements of the track heights in the data group to be made. Once it is judged that a sufficient number of measurements have been made, the measurements (for example 128 measurements) are averaged to obtain a Time-Tracking measurement value for the data group. A detailed description of a process that the tape drive 5 can operate to obtain the Time-Tracking measurement value can be found in EP 0 671 735 (Hewlett-Packard Ltd), the content of which is incorporated herein by reference.

Conventionally, the appended data group(s) is/are always written at the tape drive's known nominal write height; the tape drive does not attempt to write the new data tracks at the same height as the tracks of the data group(s) prior to the append point. This is done because if the data group(s) ahead of the append point is/are at an extreme height, the current tape drive may not be able to write whole tracks at the same height. Thus in conventionally written data, there can be a step difference in the track heights before and after the append point. In the present embodiment, the difference between the track reference value (Time-Tracking measurement value) for the data group immediately prior to the append point and the tape drive's nominal write height (which will be the height of the appended data groups and is nominally zero) is calculated as a track reference difference value, which may be positive or negative. The value of this difference is supplied to the frame data processor 41, which stores it in the sub-code unit 67. The sub-code unit 67 sets the bytes of pack item no 13 to specify the value for the track reference difference value in binary for inclusion in the sub-code area of the tracks 20, 21 of newly appended data group(s) and the sub-code area of a plurality of amble frames that are written immediately after the append point ahead of the appended data group(s). Amble frames have the LFID 0 and contain no user data. At least the first amble frame immediately following the append point, and sometimes all of the amble frames, are written at the height of the existing data group(s) that immediately precede the append point. Thus in cases in which the nominal write height of the tape drive differs from the height of the existing data group(s) immediately preceding the append point, the step change in height is between adjacent amble frames and/or the last amble frame and the new data group(s). This arrangement will now be described in more detail with reference to FIG. 5.

Figure 5:
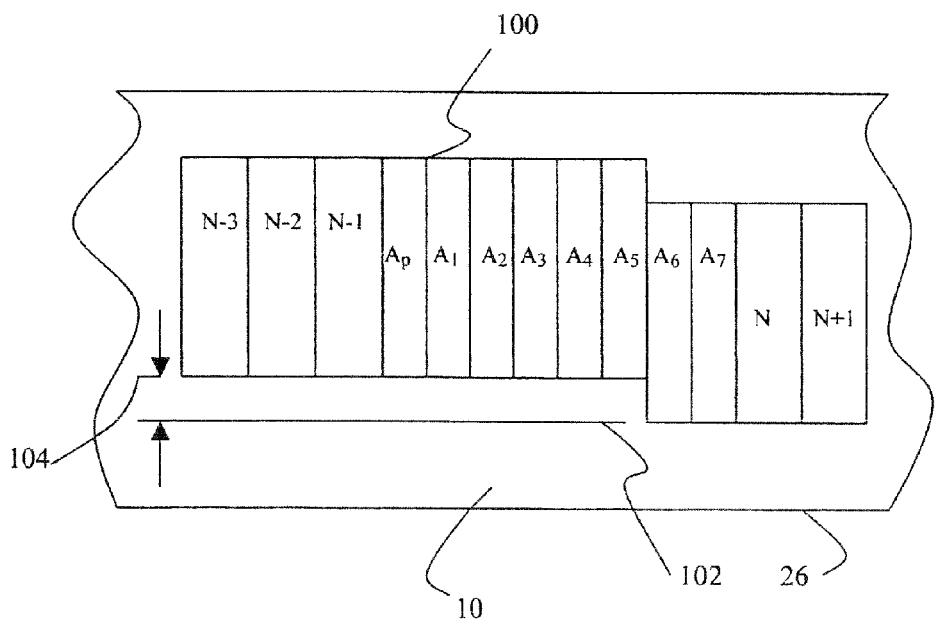
FIG. 5 is a block diagram illustrating an aspect of a data reading process.

Referring to FIG. 5, a tape 10 is shown with a number of data groups N written on it. The data groups N−3 to N−1 are existing data groups and the data groups N, N+1 are new data groups appended during a subsequent write operation. The append point 100 between the existing and appended data groups is located after the data group N−1. The appended data groups N, N+1 are written at the nominal height 102 of the current tape drive 5. The data groups N−3 to N−1 are at a different height 104, which will typically be the nominal write height of a different tape drive by which they were written. The difference between the two heights 102, 104 (indicated by the arrows in FIG. 5) is represented by the track reference difference value.

There are eight amble frames $A_p$ and $A_1$ to $A_7$ separating the last of the existing data groups (data group N−1) and the first of the appended data groups (data group N) and the append point 100 is between the amble frame $A_p$ and the amble frame $A_1$. The amble frames $A_1$ to $A_7$ contain sub-code, which includes the track reference difference value. There is no user data in the tracks 20, 21 of the amble frames. The first five amble frames $A_1$ to $A_5$ are written at the write height 104 of the data groups N−3 to N−1 immediately preceding the append point 100 and not at the nominal write height 102 of the tape drive by which they were written. The next two amble frames $A_6$, $A_7$ are written at the nominal write height 102 of the tape drive by which they were written, as are the appended data groups N, N+1. In addition to the track reference difference value, the sub-code written in the amble frames $A_1$ to $A_7$ includes a count that indicates how many frames there are between the current frame and the frame after which the height of the tracks will change (in this example, frame $A_5$). Thus, in the illustrated example the sub-code contained in amble frame $A_1$ includes the track reference difference value and a count value that indicates the height of the tracks will change in four frame's time.

When the tape drive 5 commences a read operation of the data stored on the tape 10, it first carries out a Time-Tracking calibration to obtain a Time-Tracking measurement value as the track reference value for the first data group from which data is to be read (in this example data group N−3). The system controller 43 makes this value available to the ATF unit 49, which uses it in performing the control process by which the relative motion of the tape 10 and head drum is controlled during the read operation so that the respective read heads HRA, HRB lock onto the successive tracks 20, 21 of the data groups N−3 of N−1. In this way, the tape drive stream reads the data groups N−3 to N−1 in a conventional manner. It then seamlessly continues to read the amble frames and while reading the amble frames up to amble frame $A_5$ will remain in Time-Tracking lock because when those amble frames were written, they were written at the height 104 of the existing data groups N−3 to N−1. When the tape drive reads amble frame $A_1$, it will see that a step change in the height of the tracks corresponding to the track reference difference value is due to occur in four frame's time. When the amble frame $A_2$ is read, the tape drive will see that the step change is due to occur in three frame's time and in this way, the tape drive counts down to the point at which the step change occurs. After the next three frames $A_3$, $A_4$, $A_5$ (ignoring any pipeline frame delay offsets that may be required) have been read, the system controller 43 modifies the track reference value it uses in controlling the read cycles by adding the track reference difference value read from the sub-code contained in the amble frames $A_1$ to $A_5$ so that the tape drive is set to lock on and read at the height 102. The tape drive will then read the amble frames $A_6$, $A_7$ that were written at the height 102 followed by the new data groups N, N+1. The tape drive will remain locked on the height for the data groups N, N+1 until it completes the current read command or encounters another track height change indicated by a track reference difference value and countdown sequence read from the sub-code data contained in amble tracks appearing after the next append point downstream of the append point 100.

If the tape drive 5 loses lock after the append point 100, as indicated, for example, by an unacceptably high error rate in the read data or a read failure, the read process is stopped and a reread process is commenced. Although it is expected that the use of amble frames as described above will make this a rare occurrence, read problems might occur if the sub-code data is spoiled or the tape drive that wrote the amble tracks was unable to write complete amble tracks at the height 104.

The reread process is commenced by reversing the capstan 15 to move the tape 10 back past the head drum. While the tape is reversing, the read heads HRA, HRB will cross several tracks of the data groups N, N+1 during each sweep, allowing the stored track reference difference value to be read from the sub-code area of these tracks. The tape drive can then perform a read retry without performing a Time-Tracking calibration by simply modifying the track reference value at the append point using the track reference difference value. Specifically, in this embodiment, the track reference difference value is added to the track reference value (Time-Tracking measurement value) used in controlling relative motion of the tape and head drum during the preceding read process to obtain a modified track reference value for the reread process. The tape drive then uses the modified track reference value to complete the reread process and seamlessly continues to read data using the modified track reference value as the track reference value until it completes the current read command or encounters another height change indicated by a track reference difference value and countdown sequence read from the sub-code data contained in amble tracks appearing after the next append point downstream of the append point 100. The above-described use of the track reference difference value for a reread process is described in greater detail in the Applicant's co-pending United Kingdom Patent Application Number 0701811.2 the entire content of which is incorporated herein by reference.

In embodiments in which a last append absolute frame number value is stored in the sub-code of the data tracks 20, 21, the system controller 43 can make use of this information to accurately determine whether the data read error condition originates at an append point. Thus, the system controller 43 can make a determination as to whether the error is likely to be the product of track height differences at an append point and use that information in deciding whether to initiate a reread process using the track reference difference value. A methodology for storing the last append absolute frame number in the sub-code of the data tracks 20, 21 using the tape drive 5 and subsequently reading that number is described in U.S. Pat. No. 6,526,482 (Hewlett-Packard Company and Sony Corporation), the content of which is incorporated herein by reference.

In the embodiment, when the tape drive 5 is about to append a new data group(s), it determines the track reference value of the existing data group immediately prior to the append group using a real time measurement process. In an alternative embodiment, a track reference value for the relevant data group is first sought in a memory within the tape drive. Typically, if the relevant data group has been written to or read from relatively recently, the track reference value will be cached in memory. There are separate caches for values associated with read operations and values associated with write operations. Usually, data is deleted from these caches after a set holding period, for example four minutes. Thus, if a track reference value can be found in memory, it should be sufficiently "fresh" to be valid and can be used to save running a Time-Tracking calibration process. As previously noted, running Time-Tracking calibration processes slows down the operation of the tape drive and causes additional wear to the read heads and tape. If a track reference value cannot be found in memory, the system controller 43 can then initiate a Time-Tracking calibration process to obtain a value using measurements.

It will be understood that by inserting amble frames containing a track reference difference value between existing and appended data groups on either side of an append point at the height of the tracks of the existing data groups, the tape drive can be forewarned of any change in the read height before reaching the point at which the change occurs. This allows the tape drive to adjust its control settings as the change occurs so that the relative motion of the tape and the head drum should be correctly set to the read height of the appended data group(s) as these move into position to be read. Thus, the data read process should continue seamlessly despite the change in height of the tracks of the data groups on either side of the append point.

The amble frames may all be written at the height of the data group immediately preceding the append point, so that any change in read height occurs between the last amble frame and the first of the appended data groups. Alternatively, there may be one or more amble frames immediately preceding the first of the appended data groups written at the same height as the appended data groups. This has the advantage that if the amble frames written at the height of the data groups preceding the append point are incomplete such that the track reference difference value cannot be read from them, the value may be accessed in time for the tape drive to make the read height adjustment before the appended data groups are read. As described above, the track reference difference value is also stored in the sub-code area of the appended data groups. Accordingly, if there is a read fail, when the tape drive reverses direction to reposition for a reread process, the track reference difference value can be obtained and used in the reread process, thus avoiding the need to make a Time-Tracking calibration measurement. Thus in this embodiment, there are three stages at which the control of the relative motion of the head drum and tape can be corrected to take account of differences in the height of the tracks of data groups after an append point before the tape drive needs to perform a Time-Tracking calibration.

It will be appreciated that the number of amble frames shown in FIG. 5 is purely exemplary and all that is needed is for there to be a sufficient number at the height of the preceding data group to allow the tape drive to read the track reference difference value and location of the height change before the appended data is reached so that the tape drive can adjust to the height of the new data without stopping or repositioning the tape. One such amble frame may be sufficient. However, it will be understood that having a plurality of such frames will reduce the possibility of read errors by providing a greater number of occurrences of the track reference difference value. In this connection, it will be noted that in the DAT 160 format, the sub-code is repeated forty eight times in each frame and so providing multiple amble frames written at the height of the last of the existing data groups before the append point makes it less likely the tape drive will fail to read the track reference difference value due to, for example, localised tape damage or write errors when the sub-code was written.

It will be appreciated that since the amble frames do not contain any user data and the sub-codes appearing in the amble frames appear also in the data groups (which do contain user data), in the event the amble frames written at the height of the last data group preceding the append point cannot be written completely (perhaps as a result of being at an extreme height), the missing sub-code can be recovered from the subsequent data groups and no user data is lost. Thus, there is provided the possibility of having continuous streaming during reading of data from a tape by inserting after the append point and ahead of the appended data groups one frame, or a relatively small number of frames, that do not contain any user data and whose sub-code is repeated in the frames of the appended data groups such that in the event the frame(frames) are incomplete, no data is lost and the reading process can be continued by other means.

It will be appreciated that while in the case of the described embodiment a track reference difference value is stored in an amble frame or frames between existing data and appended data, this is not essential. Instead, data from which a track reference value can be derived could be included in the amble frame or frames. In that case, the track reference difference value would be determined using such data as a part of a read process.

It will be appreciated that the processes described can be implemented without providing any additional hardware in the tape drive. This allows implementation without increased cost and reliability concerns. Implementation can thus be by way of suitable computer program instructions embodied in firmware or software, making it easy to add the height adjustment facility illustrated by the described embodiment to new build equipment and 'retrofit' it to existing equipment.

It will be appreciated that embodiments of the invention include apparatus for reading data from a data storage medium on which data is stored in data groups comprising tracks extending across said storage medium and spaced from a reference edge of said data storage medium, the apparatus comprising a control system that outputs signals for controlling relative movement of the data storage medium and a rotatable head comprising at least one transducer for reading data from the storage medium and is operable during a read process to modify said signals based on a modified track reference value representative of a distance between tracks from a next data group to be read and said reference edge that is different to a distance between tape tracks from a last data group to be read and said reference edge, said control system determining said modified track reference value using a track reference difference value stored in or derived from data stored in at least one frame that is positioned between said last data group and said next data group and includes tracks spaced from said reference edge a distance substantially equal to said distance between said tracks of said last data group and said reference edge. The apparatus may be operable to determine a first downstream track that is spaced from said reference edge said distance the tracks of said next data group are spaced from said reference edge and use said modified track reference value to modify said signals as reading from said first downstream track commences.

It will be understood that although the illustrated embodiment has been described with reference to the DAT 160 format the invention is not limited to that format and is generally applicable to tape data storage in which data is written to the tape in tracks extending transversely of the tape.

The invention claimed is:

1. Apparatus for writing data to a data storage medium on which data is stored in data groups comprising tracks extending across said medium and spaced from a reference edge of said medium, the apparatus comprising:
 a control system operable to access data for determining a track reference difference value representative of a difference in a distance between the tracks of an existing data group on said medium and said edge and a distance between said edge and the tracks of a data group that is to be written to the medium such that it is the next data group following said existing data group and cause
i) said data for determining a track reference difference value or
ii) a track reference difference value determined using said data for determining a track reference difference value
 to be included in at least one frame that is to be written between said existing data group and said next data group such that tracks of said at least one frame are spaced from said edge by substantially the same distance as said tracks of the existing data group.

2. Apparatus as claimed in claim 1, wherein said control system is operable to cause a count value to be included in said at least one frame that is to be written between said existing data group and said next data group, said count value indicating the number of frames between the respective frame and a first downstream track that is spaced from said reference edge said distance between the reference edge and the tracks of said next data group.

3. Apparatus as claimed in claim 1, wherein said control system is operable to cause said track reference difference value to be included in said tracks of said at least one frame and the tracks of said next data group.

4. Apparatus as claimed in claim 1, wherein said control system is operable to cause at least one further frame to be written to said storage medium between said at least one frame and said next data group such that the tracks of said at least one further frame are spaced from said reference edge substantially the same distance as the tracks of said next data group and contain said track reference difference value or said data for determining a track reference difference value.

5. Apparatus as claimed in claim 1, wherein said data for determining a track reference difference value includes a track reference value representative of a distance between said tracks of the existing data group and said reference edge and said control system is operable to obtain said data by a real time measurement process or reading a memory.

6. Apparatus as claimed in claim 5, wherein said control system is operable to first read said memory and if a said track reference value representative of a distance between said tracks of the existing data group and said reference edge is not obtainable from said memory to obtain said data by said real time measurement process.

7. A method of storing data for use in controlling relative motion of a storage medium and a rotatable transducer for reading data from said medium, data being stored on said medium in data groups comprising tracks extending across the medium and spaced from a reference edge of the medium and the method comprising:

obtaining a first track reference value suitable for use in controlling said relative motion for reading a previously written data group after which at least one new data group is to be written;
 obtaining a second track reference value suitable for use in controlling said relative motion for reading said at least one new data group; and
 storing:
 i) said first and second track reference values, or
 ii) a track reference difference value based on said first and second track reference values
 in at least one frame disposed between said previously written data group and at least one new data group, said at least one frame comprising tracks positioned on said medium so as to be spaced from said edge substantially the same distance as the tracks of said previously written data group such that during a read process said relative motion can be adjusted between completion of reading from said previously written data group and commencement of reading from said at least one new data group using:
 i) a track reference difference value derived from said stored first and second track reference values, or
 ii) said stored track reference difference value.

8. A method as claimed in claim 7, wherein said first track reference value is obtained by a real time measurement process or by reading a memory.

9. A method as claimed in claim 8, comprising first reading said memory and if a track reference value for said previously written data group is not obtainable from said memory, obtaining said value using said real time measurement process.

10. A method as claimed in claim 7, comprising storing a count value in said at least one frame, said count value indicating a number of frames between the respective frame and a first downstream track that is spaced from said reference edge a distance different to said distance the tracks of said previously written data group are spaced from said reference edge.

11. A method as claimed in claim 10, wherein said first track is a track of a said frame.

12. A method of controlling relative motion of a data storage medium on which data is stored and a rotatable transducer for reading data from said storage medium during a read process, the data being stored in data groups comprising tracks extending across the storage medium and spaced from a reference edge of said data storage medium and the method comprising:
 controlling said relative motion while reading data from at least one data group whose tracks are spaced a first distance from said reference edge using a first track reference value representative of said first distance;
 controlling said relative motion while reading data from at least one data group whose tracks are spaced a second distance from said reference edge that is different to said first distance using a second track reference value representative of said second distance; and
 determining said second track reference value by using a track reference difference value to modify said first track reference value, said track reference difference value being:
 i) stored in, or
 ii) derived from data stored in
 at least one frame positioned between said at least one data group whose tracks are spaced said first distance from said reference edge and said at least one data group whose tracks are spaced said second distance from said reference edge, said at least one frame comprising tracks spaced from said reference edge a distance substantially equal to said first distance.

13. A method as claimed in claim 12, wherein there is a plurality of said frames between said at least one data group whose tracks are spaced a said first distance from said reference edge and said at least one data group whose tracks are spaced a said second distance from said reference edge, the method comprising reading respective count values from said frames, said count values indicating a number of frames between the respective frame and a first downstream track that is spaced said second distance from said reference edge.

14. An article comprising non-transitory machine-readable storage media storing instructions that upon execution cause a system having a processor to implement the method claimed in claim 7.

* * * * *